(12) United States Patent
Zima et al.

(10) Patent No.: US 11,067,037 B2
(45) Date of Patent: Jul. 20, 2021

(54) THREE-DIMENSIONAL MONOLITHIC DIAPHRAGM TANK

(71) Applicant: Moog Inc., East Aurora, NY (US)

(72) Inventors: Leonard C. Zima, South Wales, NY (US); Glenn M. Brzyski, Depew, NY (US); John C. Calnan, Conesus, NY (US)

(73) Assignee: Moog Inc., East Aurora, NY (US)

( * ) Notice: Subject to any disclaimer, the term of this patent is extended or adjusted under 35 U.S.C. 154(b) by 0 days.

(21) Appl. No.: 16/513,410

(22) Filed: Jul. 16, 2019

(65) Prior Publication Data
US 2020/0018261 A1    Jan. 16, 2020

Related U.S. Application Data

(60) Provisional application No. 62/698,339, filed on Jul. 16, 2018.

(51) Int. Cl.
*F02K 9/60*     (2006.01)
*B22F 5/10*     (2006.01)
(Continued)

(52) U.S. Cl.
CPC ............... *F02K 9/605* (2013.01); *B22F 5/10* (2013.01); *B22F 10/20* (2021.01); *F02K 9/50* (2013.01); *B33Y 10/00* (2014.12); *B33Y 80/00* (2014.12)

(58) Field of Classification Search
CPC .......... F02K 9/50; F02K 9/605; B22F 3/1055; B22F 5/10
(Continued)

(56) References Cited

U.S. PATENT DOCUMENTS 2,283,439 A * 5/1942 Herman ............... F15B 1/10
                                                              138/30
2,300,722 A * 11/1942 Schuyler ............... F15B 1/12
                                                              138/30
(Continued)

FOREIGN PATENT DOCUMENTS

CN          104451256 A     3/2015
DE          2102969 A1     10/1972
(Continued)

OTHER PUBLICATIONS

Tam, et al. "Hybrid Propellant Tanks for Spacecraft and Launch Vehicles". AIAA 2003-4607. Huntsville, Alabama. Jul. 21, 2013. Retrieved from: https://www.orbitalatk.com/commerce/Technical_Paper_Library/AIAA%202003-4607%20Hybrid%20Prop%20Tank.pdf. 16 pages.
(Continued)

*Primary Examiner* — Vishal Pancholi
(74) *Attorney, Agent, or Firm* — Harter Secrest & Emery LLP

(57) ABSTRACT

A three-dimensional monolithic diaphragm tank including a first portion having a first inner surface, a second portion having a second inner surface, and a deformable diaphragm extending from a peripheral junction with the first inner surface and the second inner surface. The first inner surface and the diaphragm defining a first chamber. The second inner surface and the diaphragm defining a second chamber. The first portion having an outlet port in fluid communication with the first chamber, and the second portion having an inlet port in fluid communication with the second chamber. The peripheral junction of the diaphragm and the first inner surface including an integral inner fillet having an inner radius.

23 Claims, 11 Drawing Sheets

(51) Int. Cl.
  *F02K 9/50* (2006.01)
  *B22F 10/20* (2021.01)
  *B33Y 10/00* (2015.01)
  *B33Y 80/00* (2015.01)

(58) Field of Classification Search
  USPC .................................................. 222/386.5
  See application file for complete search history.

(56) References Cited

U.S. PATENT DOCUMENTS

| | | | |
|---|---|---|---|
| 2,339,076 A * | 1/1944 | Huber | F15B 1/106 |
| | | | 138/30 |
| 2,347,379 A * | 4/1944 | Teeter | F15B 1/18 |
| | | | 138/30 |
| 2,389,792 A * | 11/1945 | Lippincott | F16J 3/02 |
| | | | 138/30 |
| 2,505,798 A | 5/1950 | Skinner | |
| 2,880,759 A * | 4/1959 | Wisman | F15B 1/125 |
| | | | 138/30 |
| 3,140,802 A | 7/1964 | Everett | |
| 3,190,562 A | 6/1965 | Atwood et al. | |
| 3,275,193 A | 9/1966 | Barr | |
| 3,321,112 A | 5/1967 | Cunningham et al. | |
| 3,516,578 A | 6/1970 | Grossman et al. | |
| 3,847,307 A | 11/1974 | Hosek | |
| 3,895,746 A | 7/1975 | Bauer | |
| 3,940,031 A | 2/1976 | Fishman | |
| 3,981,418 A | 9/1976 | Williamson et al. | |
| 4,013,195 A | 3/1977 | Ferris | |
| 4,120,151 A | 10/1978 | Quigley, Jr. | |
| 4,129,025 A | 12/1978 | Carey et al. | |
| 4,216,881 A | 8/1980 | Rosman | |
| 4,437,590 A | 3/1984 | Labruna | |
| H80 H | 7/1986 | Lewis | |
| 5,407,092 A | 4/1995 | Hardgrove et al. | |
| 6,129,236 A | 10/2000 | Osokin et al. | |
| 8,079,126 B2 | 12/2011 | Bampton et al. | |
| 8,499,983 B2 | 8/2013 | Conrardy et al. | |
| 9,031,820 B2 | 5/2015 | Frederick | |
| 2009/0188109 A1 | 7/2009 | Bampton et al. | |
| 2011/0039016 A1 | 2/2011 | Beard | |
| 2016/0038655 A1 | 2/2016 | Neisman et al. | |
| 2016/0052079 A1 | 2/2016 | Ackelid | |
| 2016/0061381 A1 | 3/2016 | Kotliar | |
| 2016/0297152 A1 | 10/2016 | Maggiore | |
| 2016/0325620 A1 | 11/2016 | Ballinger et al. | |
| 2017/0066187 A1 | 3/2017 | Mark et al. | |
| 2017/0129175 A1 | 5/2017 | Zitelli et al. | |
| 2017/0251713 A1 | 9/2017 | Varner et al. | |

FOREIGN PATENT DOCUMENTS

| | | |
|---|---|---|
| EP | 0641928 A1 | 3/1995 |
| EP | 1031729 A2 | 8/2000 |
| GB | 2020755 A | 11/1979 |

OTHER PUBLICATIONS

Orbital ATK. "Propellant and Pressurant Tanks", 2018. Retrieved from: https://www.orbitalatk.com/commerce/products.aspx. 2 pages.
European Patent Office (ISA/EP), International Search Report and Written Opinion for International Application No. PCT/US2019/042042, dated Oct. 29, 2019.

* cited by examiner

THREE-DIMENSIONAL MONOLITHIC DIAPHRAGM TANK

TECHNICAL FIELD

The present disclosure relates generally to the field of rolling diaphragm tanks, and more particularly to an improved monolithic rolling diaphragm tank.

BACKGROUND

Traditionally, rolling metal bladder positive expulsion tanks (e.g., rolling diaphragm tanks) are operable to expel a liquid, stored in a compartment thereof, via a central outlet utilizing a pressurized gas introduced into a portion of the tank. The difference in pressure across a diaphragm serving to effect rolling of the diaphragm upon itself to eventually assume an inside out or inverted configuration to essentially complete expulsion of the liquid from the tank. The diaphragm can be designed to "roll" at a pressure less than the pressure at which the diaphragm would be subject to buckling deformation.

Prior attempts to insure proper roll deformation of metal diaphragms have principally led to "geometric" solutions to the buckling problem, including increasing the side wall thickness of the diaphragm, reducing the length-to-diameter ratio of the diaphragm, sloping or curving the side walls of the diaphragm and/or reinforcing the side walls of the diaphragm by providing separate reinforcement elements, or forming such side walls with undulating folds or as a series of stepped diameter cylinders.

Other metal bladder tank types have included an extendable nozzle for rocket engines, which is fabricated to a frusto-conical configuration and then partially telescopically rolled upon itself to provide a nozzle having a reduced longitudinal dimension in its "stowed" condition. It has been the practice to subject the fabricated nozzle to an annealing operation in order to remove stresses introduced into the diaphragm material during fabrication with a view towards reducing rolling, i.e., gas deployment, pressure to a minimum. As a practical matter, it was conventionally found necessary to provide the nozzle with a rolling guide or filler boundary in order to avoid buckling failure of the nozzle within acceptable ranges of the ratios between the diameter, wall thickness, and length of the nozzle.

During subsequent studies of mechanically extendable stainless-steel nozzles, it was noted that when a previously deployed nozzle was re-rolled into its original "stowed" configuration, its diameter had enlarged such that it did not contact the rolling guide or filler boundary employed during the previous deployment cycle and that the rolling guide performed no function during a subsequent deployment cycle. A study of this phenomenon led to the conclusion that the rolling of the nozzle upon itself during the previous deployment cycle served to change the critical buckling/rolling pressure relationship of the material from which the nozzle was fabricated. It was then determined that nozzles which heretofore could not be deployed without the provision of a rolling guide or filler boundary to prevent buckling failure of a nozzle, could be successfully deployed if such nozzles were previously rolled and not subjected to a conventional annealing operation, while in their pre-rolled condition.

Some traditional diaphragm tanks are also somewhat asymmetric, causing an unpredictable shift in the center of gravity for a fluid filled device utilizing the diaphragm tank. Curvature of the diaphragm and uniformity of the diaphragm tank were also inconsistent and included structural deficiencies. Additionally, depending on the size and shape of the diaphragm tank, producing the traditional diaphragm tank can be time and resource intensive, requiring high levels of expertise in material selection, rolling, spinning, machining, hemming, welding, and post processing.

BRIEF SUMMARY

With parenthetical reference to corresponding parts, portions, or surfaces of the disclosed embodiment, merely for the purposes of illustration and not by way of limitation, the present disclosure provides in a first exemplary embodiment, a three-dimensional monolithic diaphragm tank, the diaphragm tank (100, 200) comprising: a first portion (110, 210) having a first inner surface (160, 260); a second portion (130, 230) having a second inner surface (170, 270); a deformable diaphragm (140, 240) extending from a peripheral junction (148, 248) with said first inner surface and said second inner surface; said first inner surface and said diaphragm defining a first chamber (122, 222); said second inner surface and said diaphragm defining a second chamber (124, 224); said first portion having an outlet port (114) in fluid communication with said first chamber; said second portion having an inlet port (132) in fluid communication with said second chamber; and said peripheral junction of said diaphragm and said first inner surface including an integral inner fillet (149) having an inner radius (R2).

The present disclosure provides in a second exemplary embodiment, a three-dimensional monolithic diaphragm tank (100), the diaphragm tank comprising: a first portion (110) having a first inner surface (160); a second portion (130) having a second inner surface (170), said second portion coupled with said first portion, wherein said first and second portions are orientated about a central axis (Z); a deformable diaphragm (140) extending from a peripheral junction (148) with said first inner surface and said second inner surface; said first inner surface and said diaphragm defining a first chamber (122); said second inner surface and said diaphragm defining a second chamber (124); said first portion having a first outlet port (114) in fluid connection with said first chamber; said first portion having a second outlet port (116) in fluid connection with said first chamber, wherein said first and second outlet ports are offset from said central axis; and said second portion having an inlet port (132) in fluid connection with said second chamber.

The present disclosure provides in a third exemplary embodiment, a three-dimensional monolithic diaphragm tank (100, 200), the diaphragm tank comprising: a first portion (110, 210) having a first inner surface (160, 260); a second portion (130, 230) having a second inner surface (170, 270), said second portion coupled with said first portion, wherein said first and second portions are orientated about a central axis (Z); a deformable diaphragm (140, 240) extending from a peripheral junction (148) with said first inner surface and said second inner surface; said first inner surface and said diaphragm defining a first chamber (122, 222); said second inner surface and said diaphragm defining a second chamber (124, 224); said first portion having an outlet port (114) in fluid connection with said first chamber; said second portion having an inlet port (132) in fluid connection with said second chamber; and said first portion, said second portion, and said diaphragm being formed as a unitary piece, having a monolithic and isotropic structure, and being of a uniform composition of metal material.

BRIEF DESCRIPTION OF THE DRAWINGS

The accompanying drawings are incorporated herein as part of the specification. The drawings described herein illustrate embodiments of the presently disclosed subject matter and are illustrative of selected principles and teachings of the present disclosure. However, the drawings do not illustrate all possible implementations of the presently disclosed subject matter and are not intended to limit the scope of the present disclosure in any way.

DETAILED DESCRIPTION

Figure 1:
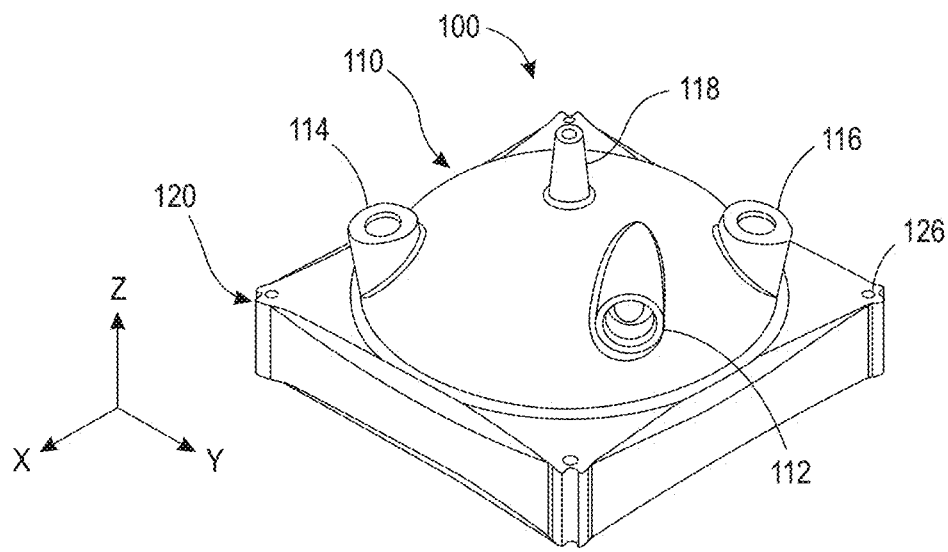
FIG. 1 is a top perspective view of a diaphragm tank according to an embodiment of the present disclosure.

It is to be understood that the invention may assume various alternative orientations and step sequences, except where expressly specified to the contrary. It is also to be understood that the specific assemblies and systems illustrated in the attached drawings and described in the following specification are simply exemplary embodiments of the inventive concepts defined herein. Hence, specific dimensions, directions, or other physical characteristics relating to the embodiments disclosed are not to be considered as limiting, unless expressly stated otherwise. Also, although they may not be, like elements in various embodiments described herein may be commonly referred to with like reference numerals within this section of the application.

It is to be appreciated that the present teaching is by way of example only, not by limitation. The concepts herein are not limited to use or application with a specific system or method. Thus, although the instrumentalities described herein are for the convenience of explanation, shown and described with respect to exemplary embodiments, it will be appreciated that the principles herein may be applied equally in other types of systems and methods involving the disclosed subject matter.

Referring now to FIGS. 1-9, in an embodiment, a rolling diaphragm tank 100 includes a shell 102 and an internal diaphragm 140. The shell 102 comprises a top portion 110, a cylindrical intermediate portion 120, and a bottom portion 130. The internal diaphragm 140 separates the interior volume of the diaphragm tank shell 102 into an upper chamber 122 and a lower chamber 124. The diaphragm tank 100 is a fluid (liquid or gas) containment and positive expulsion mechanism. As further described below, the diaphragm tank 100 is formed as a single unitary piece and is thereby monolithic, is additively manufactured, and has a homogeneous and isotropic material composition.

Figure 2:
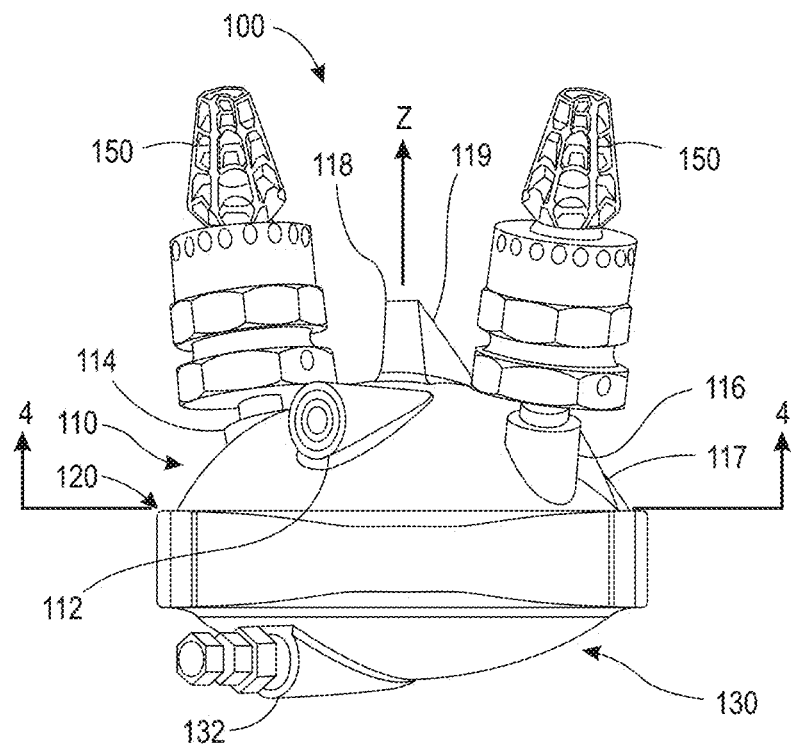
FIG. 2 is a side view of the diaphragm tank shown in FIG. 1 having thrusters coupled therewith.
Figure 7:
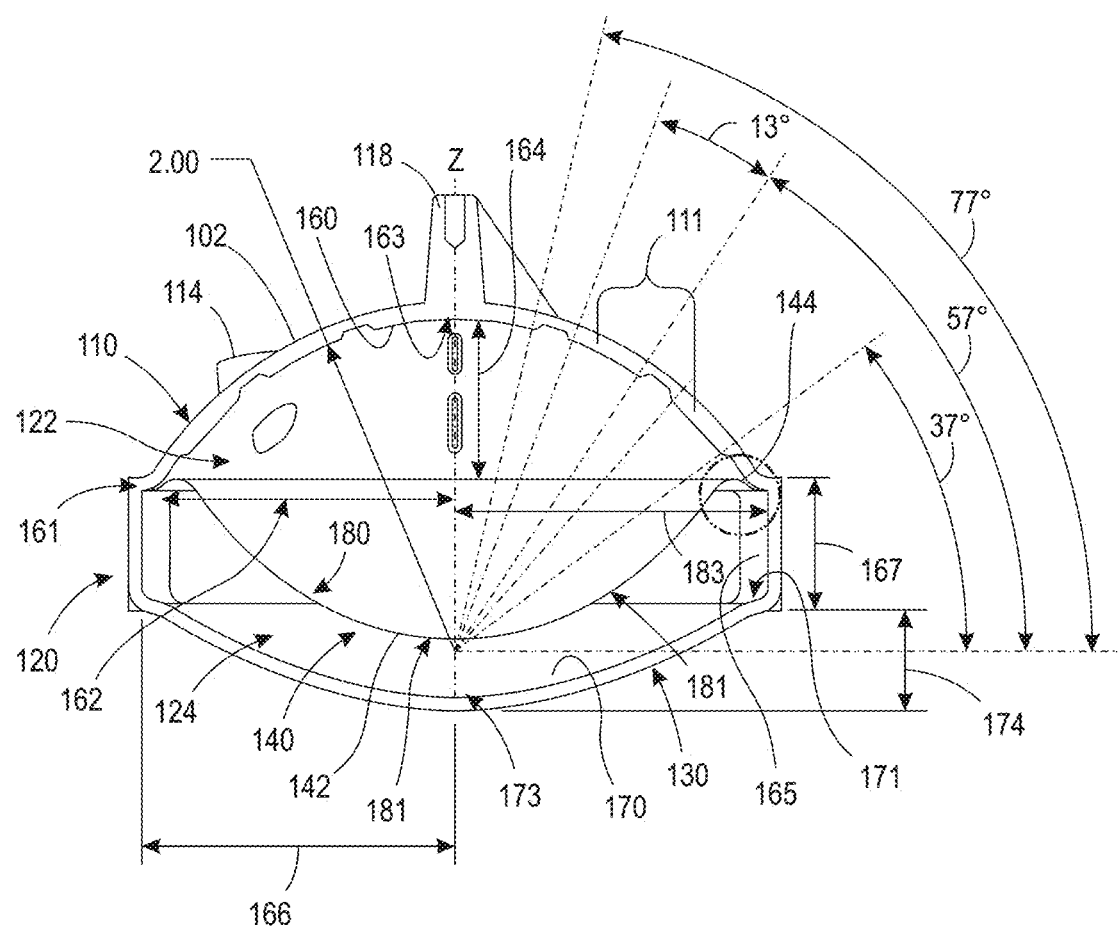
FIG. 7 is a cross-sectional side view of the diaphragm tank shown in FIG. 1.

Referring now to FIGS. 1, 2 and 7, the diaphragm tank top shell portion 110 has a generally domed configuration. As illustrated in FIG. 7, the top shell portion 110 is defined by a generally hemispherical geometry including a circular base circumference 161 having a radius 162. The top portion 110 defines an inner surface 160 that curves upwardly and inwardly from the base circumference 161 to a peak 163. The peak 163 is located at a height 164 above the plane defined by the base circumference 161. Persons skilled in the relevant art will appreciate that the diaphragm tank top portion 110 may comprise alternative configurations having various base circumference radiuses 162, peak heights 164 and curvatures.

The diaphragm tank top portion 110 includes an inlet port 112, a first outlet port 114, a second outlet port 116, and an extension 118. The diaphragm tank inlet port 112 includes an adapter/coupler operable to mechanically couple a hose or tube therewith. The inlet port 112 is in fluid communication with the diaphragm tank upper chamber 122 and is operable to communicate a fluid (e.g., liquid or gas) into the upper chamber 122.

Referring now to FIGS. 1-5 and 7, in an embodiment, the first and second outlet ports 114, 116 are positioned off-center from the top portion peak 163. Rather than being located coincident with the top portion peak 163, the first outlet port 114 is positioned through the top portion inner surface 160 between a first point on the base circumference 161 and the peak 163, and the second outlet port 116 is positioned through the top portion inner surface 160 between a second point on the base circumference 161 and the peak 163. In an embodiment, the first outlet port 114 is located 180° about the Z-axis from the second outlet port 116. In an embodiment, the first and second outlet ports 114, 116 each include a boss extending outwardly from the outer surface of the diaphragm tank top portion 110. As illustrated in FIG. 2, thrusters 150 may be coupled with the bosses of the first and second outlet ports 114, 116. Thus, the first and second outlet ports 114, 116 may port directly to a thruster 150, respectively, enabling the rolling diaphragm tank 100 to operate as a direct manifold. Accordingly, the off-center position of the first and second outlet ports 114, 116 facilitate utilization of the rolling diaphragm tank 100 in fluid spacecraft propulsion systems.

The location and position of the first and second outlet ports 114, 116 may be varied as necessitated by design requirements. For example, in an embodiment, the first and second outlet ports 114, 116 and the extension 118 are orientated generally perpendicular to the Z-axis, similar to the orientation of the inlet port 112.

Figure 3:
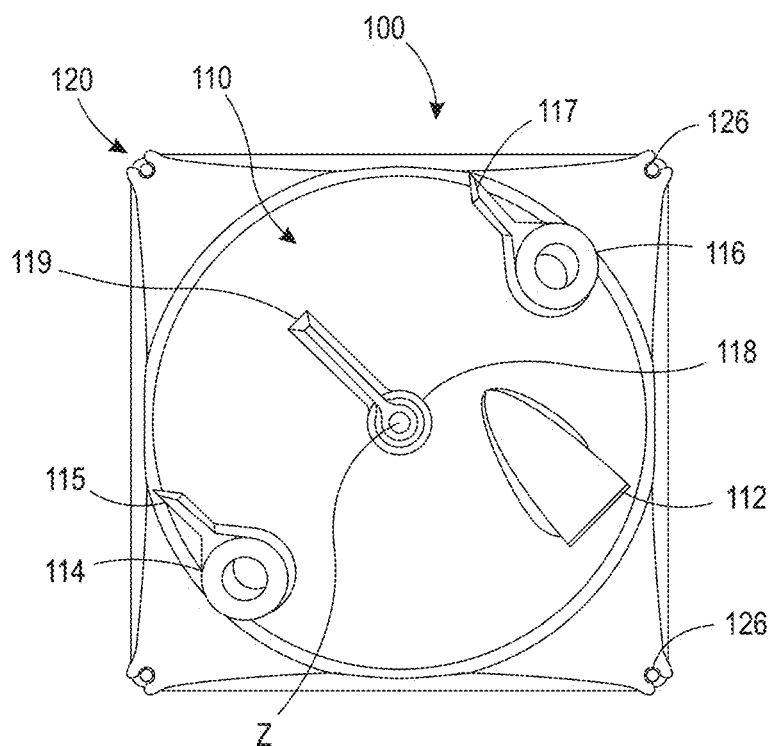
FIG. 3 is a top view of the diaphragm tank shown in FIG. 1.

As illustrated in FIGS. 2 and 3, in an embodiment, the first and second outlet ports 114, 116 are reinforced by structural supports 115, 117, respectively, and the extension 118 is reinforced by a structural support 119. In an embodiment, the supports 115, 117, 119 comprise a generally triangular geometry in which a first side of the support 115, 117, 119 abuts the first outlet port 114, second outlet port 116, or extension 118, respectively, a second side of the support 115, 117, 119 abuts the outer surface of the diaphragm tank top portion 110, and a third side of the support 115, 117, 119 extends from adjacent the outermost portion of the first outlet port 114, second outlet port 116, or extension 118, respectively, to the outer surface of the diaphragm tank top portion 110. In an embodiment, each of the supports 115, 117, 119 extend parallel to one another in one direction. The extension 118 is operable to attach the rolling diaphragm tank 100 to another structure; for example, a spacecraft.

Figure 4:
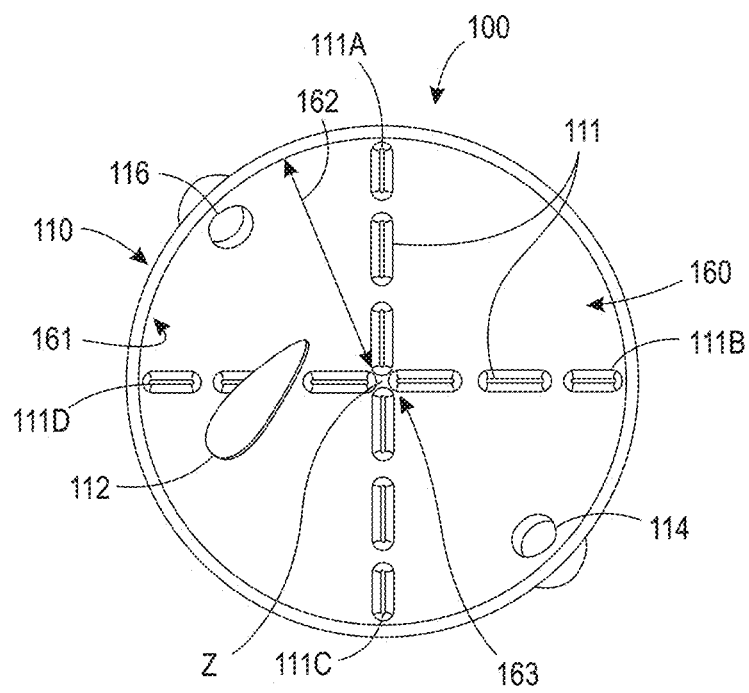
FIG. 4 is a cross-sectional bottom view of a portion of the diaphragm tank shown in FIG. 1.
Figure 8:
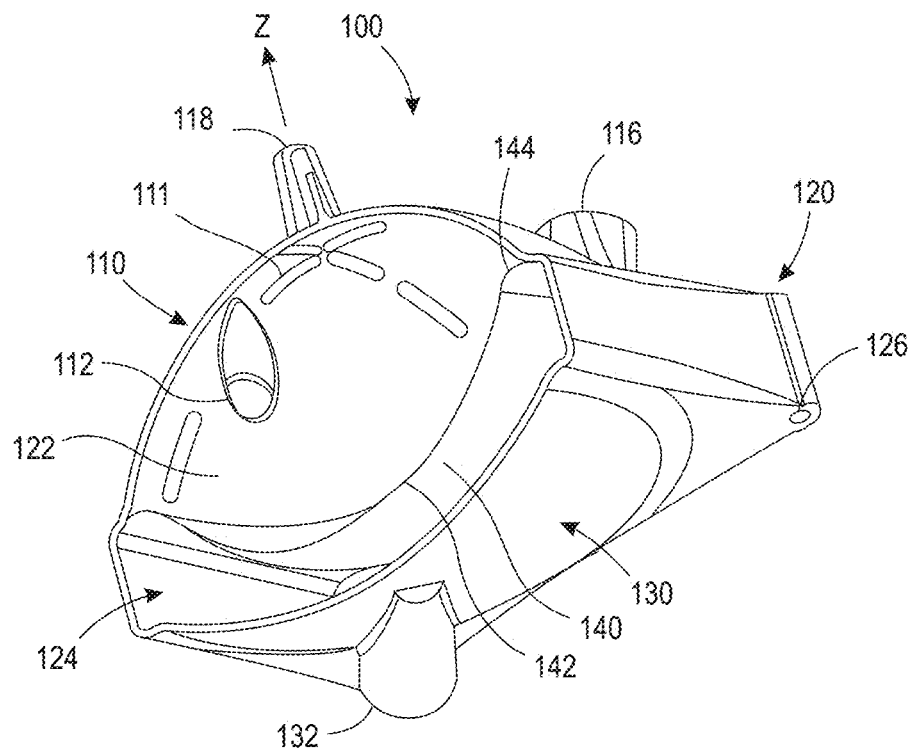
FIG. 8 is a cross-sectional bottom perspective view of a portion of the diaphragm tank shown in FIG. 1.

As illustrated in FIGS. 4 and 7-8, in an embodiment, the diaphragm tank top portion inner surface 160 includes a plurality of inwardly protruding ridges 111. Referring now to FIG. 4, in an embodiment, the ridges 111 comprise four series 111A, 111B, 111C, 111D of protrusions on the inner surface 160. The four series of ridges 111A, 111B, 111C, 111D are oriented about the peak 163 at ninety degree intervals about the Z-axis (i.e., positioned in a perpendicular configuration). Each series of ridges 111A, 111B, 111C, 111D includes a portion located nearest to the peak 163 which abut one another approximating a "+" symbol. The ridges 111 may protrude from the inner surface 160 a uniform distance.

The ridges 111 enable a directing of fluid in the upper chamber 122 towards the first and second outlet ports 114, 116 when the fluid is being expelled from the diaphragm tank 100. As the diaphragm 140 moves towards the peak 163 of the diaphragm tank top portion 110, the ridges 111 provide a structural stop. The ridges 111 prevent the inverted diaphragm 140 from sealing against the top portion inner surface 160 and closing-off fluid communication between the top portion upper chamber 122 and the first and second outlet ports 114, 116. As illustrated in FIGS. 4 and 7-8, the ridges 111 are orientated on the top portion inner surface 160 to allow the complete and uniform porting of fluid, such as propellant, from the diaphragm tank upper chamber 122 via the first and second outlet ports 114, 116 when the diaphragm 140 is actuated/deformed and rolls up the top portion inner surface 160.

The height, width, position, number and configuration of the ridges 111 may be varied as desired. In an embodiment, the ridges 111 are stitch printed on the inner surface 160. As illustrated in FIG. 4, in an embodiment, the width of the ridges 111 on the top portion inner surface 160 is less than a diameter of an opening of the first and second outlet ports 114, 116 in the inner surface 160. In another embodiment, the width of the ridges 111 is greater than the opening diameter of the first and second outlet ports 114, 116 in the inner surface 160.

The diaphragm tank intermediate portion 120 is generally positioned between the top portion 110 and the bottom portion 130. As illustrated in FIGS. 1-3 and 5-8, an outer surface of the intermediate portion 120 has a generally rectangular cuboid shape. Referring now to FIGS. 6 and 7, an inner surface 165 of the intermediate portion 120 defines a generally cylindrical geometry having a radius 166. In an embodiment, the intermediate portion inner surface 165 has a height dimension 167 that is less than the height dimension 164 of the top portion 110. In an alternate embodiment, the outer surface of the diaphragm tank intermediate portion 120 includes a generally cylindrical shape. The diaphragm tank intermediate portion 120 may also include a plurality of fastener apertures 126 generally positioned at the four corners thereof. The fastener apertures 126 may extend from a top surface to a bottom surface of the intermediate portion 120. In an embodiment, the fastener apertures 126 may be utilized to couple the diaphragm tank 100 to another structure (e.g., to a body of a spacecraft).

The diaphragm tank bottom portion 130 is generally positioned below the intermediate portion 120, opposite the top portion 110. As illustrated in FIGS. 2 and 5-8, in an embodiment, the bottom portion 130 has a generally domed configuration. As illustrated in FIG. 7, the bottom portion 130 is defined by a generally hemispherical geometry including a circular base circumference 171 having a radius 162. The bottom portion 130 defines an inner surface 170 that curves upwardly and inwardly from the base circumference 171 to a peak 173. The peak 173 is located at a height 174 below the plane defined by the base circumference 171. Persons skilled in the relevant art will appreciate that the diaphragm tank bottom portion 130 may comprise alternative configurations having various base circumference radiuses 162, peak heights 174 and curvatures.

Figure 5:
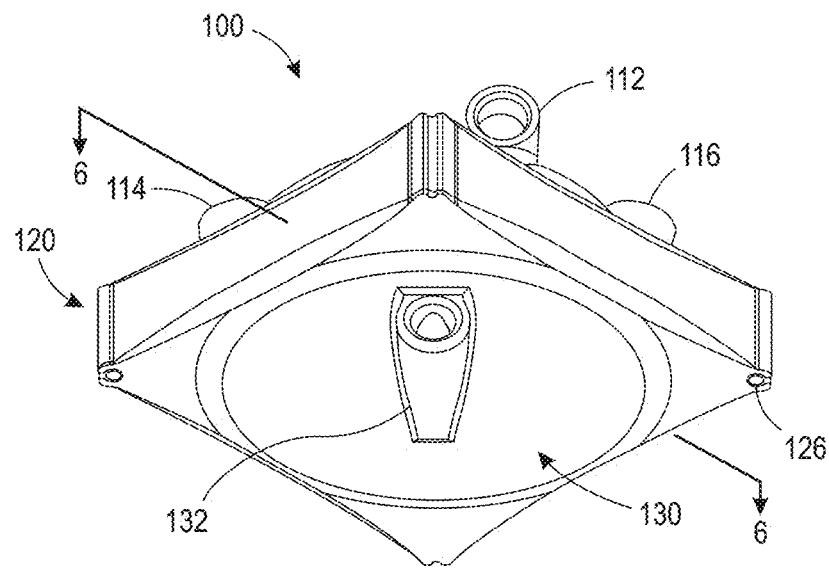
FIG. 5 is a bottom perspective view the diaphragm tank shown in FIG. 1.
Figure 6:
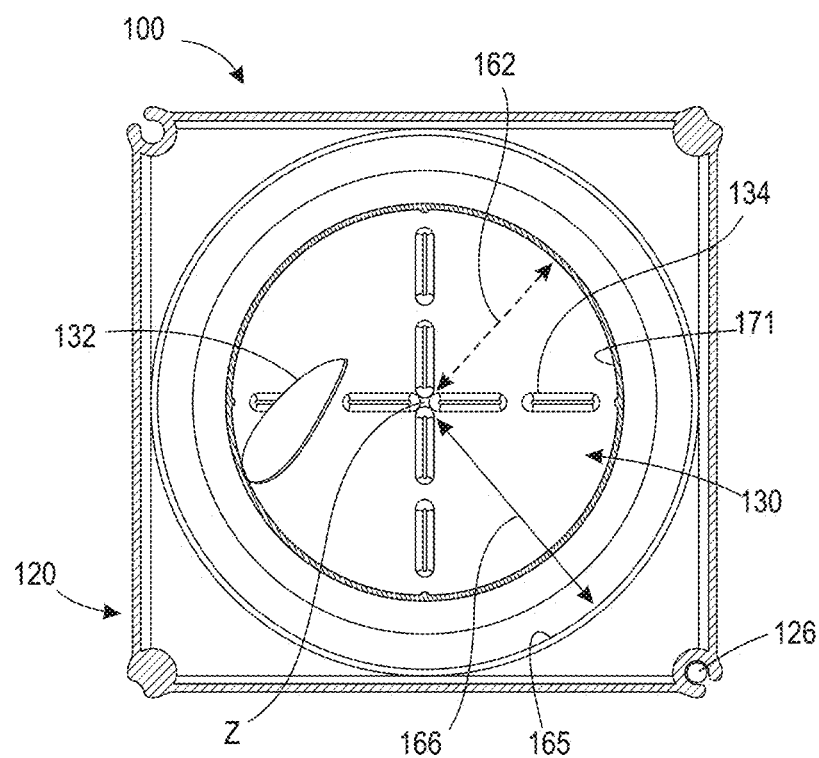
FIG. 6 is a cross-sectional top view of a portion of the diaphragm tank shown in FIG. 1.

As illustrated in FIGS. 2, 5 and 8, the diaphragm tank bottom portion 130 includes an inlet port 132 operable to communicate fluid (e.g., liquid or gas) into the diaphragm tank lower chamber 124. The fluid received in the lower chamber 123 is operable to pressurize the system. The inlet port 132 may include an adapter/coupler operable to mechanically couple a hose or tube with the inlet port 132. As illustrated in FIG. 6, in an embodiment, similar to the diaphragm tank top portion 110, the bottom portion inner surface 170 may include a plurality of inwardly extending ridges 134. The ridges 134 comprise four series 134A, 134B, 134C, 134D of protrusions on the bottom portion inner surface 170. The four series of ridges 134A, 134B, 134C, 134D are oriented about the peak 173 at ninety-degree intervals about the Z-axis (i.e., positioned in a perpendicular configuration). In an embodiment, each series of ridges 134A, 134B, 134C, 134D includes a portion located nearest to the peak 163 which abut one another approximating a "+" symbol. The ridges 134 may protrude from the inner surface 170 a uniform distance.

Figure 9:
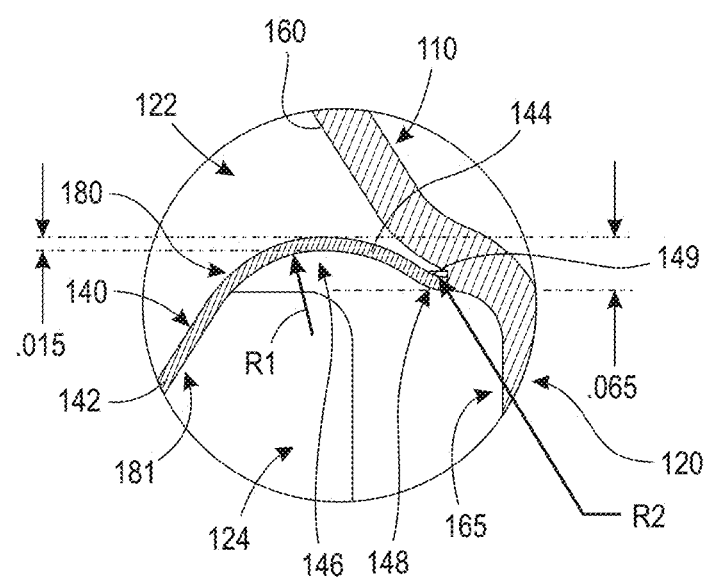
FIG. 9 is a cross-sectional detail view of a diaphragm collar of the diaphragm tank in shown in FIG. 7, taken within the indicated circle of FIG. 7.

As shown in FIGS. 7-9, the diaphragm 140 is configured to be wholly retained within diaphragm tank 100 and to separate the interior volume defined by inner surfaces 160, 165, and 170 into the upper chamber 122 and the lower chamber 124. In an embodiment, the diaphragm 140 comprises a deformable rigid metal diaphragm. With reference to FIGS. 7 and 9, the diaphragm 140 has a generally circular outer circumference with a radius 183. The diaphragm 140 includes opposed upper and lower surfaces 180, 181. The diaphragm 140 comprises a diaphragm body 142 and a diaphragm collar 144. The diaphragm collar 144 is an outer portion (e.g., rim) extending about the diaphragm body 142. During the additive manufacturing process as described below, the diaphragm 140 is additively manufactured such that the diaphragm collar 144 extends generally from the top portion inner surface 160 and the intermediate portion inner surface 165. In an embodiment, the diaphragm collar 144 may be unified with the intermediate portion 120. In another embodiment, the diaphragm collar 144 may be unified with the bottom portion 130. In yet another embodiment, the diaphragm collar 144 may be formed between the intermediate portion 120 and the bottom portion 130.

The diaphragm 140 may have a thickness between the upper and lower surfaces 180, 181. The thickness of the diagram 140 may vary as a function of the radial distance from the Z-axis. Thus, the diaphragm 140 may have a non-uniform thickness that is a function of the desired yield strength for that portion of the diaphragm 140. Such variability may typically be within a range of 0.015-0.100 inches, but may be limited by the additive manufacturing process capability to produce a non-porous thin-walled membrane (e.g., diaphragm).

As shown in FIG. 9, when at equilibrium, the lower surface 181 of the diaphragm collar 144 and the intermediate portion inner surface 165 are joined at a radiused diaphragm gutter 146 having a radius R1, which in this embodiment is about 0.16 inches. In this embodiment, the pressure in the diaphragm tank lower chamber 124 is set at about 400 PSI, which is sufficient pressure to expel the fluid in the upper chamber 122 through the first and second outlet ports 114, 116 and into the thrusters 150. However, depending on the shape and dimension of the diaphragm tank 100, the pressure in the lower chamber 124 and the diaphragm gutter radius R1 may vary to provide sufficient pressure to expel the fluid in the upper chamber 122 through the first and second outlet ports 114, 116. For example, a larger diaphragm may require a greater pressure value in the lower chamber 124 to completely expel the fluid in the upper chamber 122 through the first and second outlet ports 114, 116.

The diaphragm tank top portion 110 and the diaphragm tank intermediate portion 120 are connected at a radiused junction 148. The diaphragm collar 144 and the top portion inner surface 160 are also joined at the radiused junction 148 to form an integral inner fillet 149 having a radius R2. In an embodiment, the inner fillet radius R2 is a minimum of 0.005 inches. The inner fillet 149 includes a curved surface that blends the surfaces/faces of the diaphragm upper surface 180 and the top portion inner surface 160 to prevent a stress point from occurring at the radiused junction 148. In an embodiment, diaphragm collar 144 has a thickness of 0.015 inches at the bottom of the diaphragm gutter 146 relative to chamber 124, and the diaphragm gutter 146 has a depth of about 0.065 inches.

With the diaphragm tank lower chamber 124 pressurized, and as the fluid in the upper chamber 122 is allowed to be expelled, the diaphragm 140 will reposition itself towards the diaphragm tank top portion 110, with the diaphragm upper surface 180 rolling up incrementally and circumferentially from the radiused junction 148 against the diaphragm tank top portion inner surface 160. The radiused junction 148 of the diaphragm collar 144, the diaphragm tank top portion 110, and the diaphragm tank intermediate portion 120 is configured to allow the diaphragm upper surface 180 and the diaphragm tank top portion inner surface 160 to incrementally make contact so as to decrease the amount of fluid remaining in the radiused junction 148 when the fluid is expelled from the diaphragm tank upper chamber 122. The inner fillet 149 comprises close tolerances and a minimal inner fillet radius R2 such that as fluid is expelled from the diaphragm tank upper chamber 122, the center of gravity of the fluid of the diaphragm tank 100 remains substantially coincident with the Z-axis of the diaphragm tank 100 during the entire fluid expulsion process.

Utilizing special tooling and operation, the diaphragm tank 100 is configured such that it can be re-filled and drained multiple times without moving. The center of gravity of the diaphragm tank 100 is defined by the diaphragm 140 at any point during fluid expulsion, i.e., free-surface liquid sloshing is completely absent during use of the diaphragm tank 100. Metallic mechanical diaphragm 140 of diaphragm tank 100 provides an impermeable fluid barrier with the use of properly selected compatible materials. A mechanical leak path in the diaphragm tank 100 may be utilized to allow propellant to circumvent the diaphragm 140 and mix with a typically inert pressurizing media such as gaseous helium or nitrogen. Prior to installation, testing may verify the integrity of diaphragm tank 100.

Figure 14:
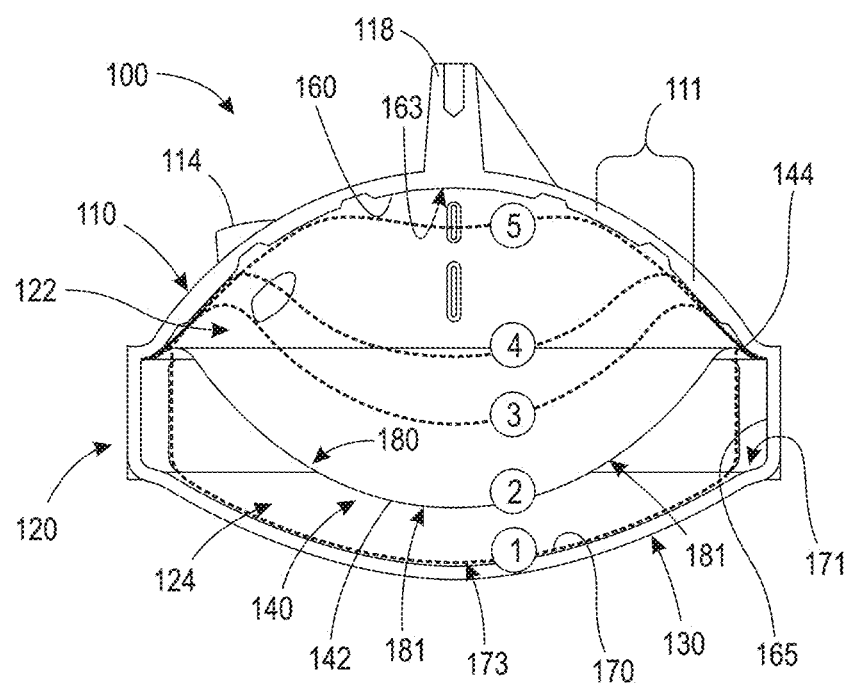
FIG. 14 is a cross-sectional side view of a diaphragm of a diaphragm tank in a plurality of positions.

Referring to FIG. 14, examples of various positions of the diaphragm 140 within the diaphragm tank 100 are illustrated in schematic. In the first position 1, the diaphragm lower surface 181 is located adjacent to the bottom portion inner surface 170. Fluid has yet to be injected into lower chamber 124 to create an upward force against the diaphragm lower surface 181. In the second position 2, fluid has been injected into lower chamber 124 through the inlet port 132 of the diaphragm tank bottom portion 130. As fluid enters the lower chamber 124, the pressure within the lower chamber 124 increases, causing the diaphragm 140 to reposition in an upward direction towards the diaphragm tank top portion 110. In an embodiment, in the second position 2 the diaphragm 140 has reached a stable position such that the diaphragm junction 148 creates an optimal inner fillet radius R2. In another embodiment, in the third position 3 the diaphragm 140 has reached a stable position such that the diaphragm junction 148 creates an optimal inner fillet radius R2. In the fourth position 4, at least one of the first and second outlet ports 114, 116 has been opened such that at least one of the first and second outlet ports 114, 116 is in fluid communication with, for example, a thruster 150. Because the lower chamber 124 is pressurized, the diaphragm 140 is subject to a force in an upwards direction, and opening at least one of the first and second outlet ports 114, 116 causes the fluid in the upper chamber 122 to be communicated through at least one of the first and second outlet ports 114, 116. At the fifth position 5, a majority of the liquid in upper chamber 122 has been expelled. As such, the diaphragm upper surface 180 is positioned adjacent to an upper portion of the top portion inner surface 160.

In an embodiment, the diaphragm tank 100 is additively manufactured as one continuous piece using additive manufacturing process techniques. The additive manufacturing process is configured such that the top portion 110, the intermediate portion 120, the bottom portion 130, and the diaphragm 140 have an elongated grain structure to produce the above-referenced radiused junction 148 and diaphragm gutter 146 and yet retain elasticity to decrease the amount of fluid that remains in the radiused junction 148 when fluid is expelled from the diaphragm tank upper chamber 122.

The diaphragm tank 100 may comprise titanium. In an embodiment, the additive manufacture process includes rolling titanium material onto a titanium material bed. A portion of the titanium material is then transformed by energy beams (e.g., laser, electron beam) to form a hardened titanium material. In an embodiment, the steps of rolling the titanium material onto the titanium bed and then transforming a portion of the titanium material into a hardened titanium material may utilize laser powder bed fusion technology. The continued process of rolling and transforming the titanium material forms monolithic diaphragm tank 100 with a radial configuration. In an embodiment, the titanium material may be CP Grade 1 titanium powder. In another embodiment, the diaphragm tank 100 material may be any material suitable for the intended purpose as understood by one of ordinary skill in the art.

The diaphragm tank 100 material may be selected for its compatibility with the intended expulsion fluid and for long-term storability. The expulsion fluid may be, but is not limited to, NTO, MMH, and N2H4. The aerospace industry desires to move away from traditional propellants in favor of less hazardous propellants. The diaphragm tank 100 material selection, such as CP Grade 1 titanium powder, may be utilized with "green" propellants such as AF-M315E.

Analytical models and material selections for the diaphragm tank 100 design may be utilized to predict the diaphragm tank 100 pressure drop characteristics, position, and volumetric displacement. The diaphragm 140 may roll at an outer rim roll radius (i.e., an inner fillet radius R2 of the diaphragm collar 144) during expulsion that helps center the center of gravity along the Z-axis of the diaphragm tank 100. Diaphragm 140 design may minimize asymmetry (e.g., tilting) during fluid expulsion. As such, as the propellant is being expelled, drifting of the center of gravity off the diaphragm tank Z-axis is minimized. However, slight tilting may be experienced due to minor variations in the additive manufacturing process, raw material properties, achieved thicknesses, etc. The slight tilting may correct itself during the expulsion process. The static center of gravity of the diaphragm tank 100 is calculated for the tank assembly versus the amount of propellant expelled based on the diaphragm tank diaphragm 140 position.

The internal mechanical barrier (e.g., diaphragm 140) is additively manufactured to provide a maximum expulsion efficiency for any given radiused containment pressure vessel per the volumetric equation of an ellipse as provided below.

$$\text{volume} = 4\pi R_1 R_2 R_3/3$$

The diaphragm ΔP (e.g., position) of diaphragm tank 100 is a function of the diaphragm 140 position in the expulsion cycle.

At a maximum available design capacity, the diaphragm ΔP may be at 0% expelled. The diaphragm ΔP increases at the end of the expulsion cycle until there is no more usable propellant (e.g., expulsion >99%). Depending on propellant load requirements, the diaphragm 140 start position may be at an equivalent percentage of the diaphragm tank 100 maximum design capacity. Requirements for a "blow-down" type propulsion system (e.g., diminishing pressure in use by design) may result in partially filled diaphragm tanks. A partially filled diaphragm tank 100 may provide for an additional margin at loading of the diaphragm tank 100. Partial loading may enable the available pressurization volume to alone provide the fluid expulsion force. However, a diaphragm tank 100 that is partially loaded may additionally utilize an external pressure source volume (e.g., a pressure tank).

Once there is a demand for propellant from the diaphragm tank upper chamber 122 (e.g., thrusters firing), the fluid pressure in the lower chamber 124 will displace the diaphragm 140. In an embodiment, the propellant located in the diaphragm tank upper chamber 122 is a liquid and the fluid located in the diaphragm tank lower chamber 124 is a gas. If there is no demand for the propellant, the diaphragm 140 may remain at equilibrium and in contact with the fluid (e.g., $P_{liq} = P_{gas} - \Delta P_{Diaphragm}$). In a "blow-down" propellant system, the diaphragm tank diaphragm 140 position (e.g., the center of gravity) may be estimated during a mission based on:

1) Tank lower and upper chamber 124, 122 volumes (e.g., gas and liquid);
2) Initial propellant load and pressurization; and
3) Lower chamber 124 pressure and diaphragm tank 100 temperature.

In an embodiment, the diaphragm tank 100 is manufactured using a Laser Powder Bed Fusion (LPBF) or a Selective Laser Melting (SLM) machine. LPBF machines promote epitaxial grain growth, i.e., elongated grains in the build (Z-axis) direction. The 3D-printed microstructure is based on the fusion weldment. In the case of LPBF machines, the small spot size of the laser generates a very fine microstructure that is starkly different than any wrought, cast, or extruded grain structures. In the as-printed condition, it is generally acceptable to have greater strength in the Z-axis. In the X-Y plane, the alloy may be better at handling bending moments when the alloy protrudes from the wall.

Heat treatments also result in grain coarsening. Since the as-printed microstructure of diaphragm tank 100 is so fine, heat treatment results in growth/recrystallization, if temperatures are high enough. If full recrystallization occurs, one can expect a much more equiaxed grain structure (i.e., grains no longer elongated in any direction). This results in more isotropic mechanical properties and behavior of the diaphragm tank 100.

Chemical composition of titanium powder or its alloys can be adjusted at the WT % level to tune material properties. Titanium and its alloys have mechanical properties that are strongly linked with oxygen content. The higher the oxygen content, the higher the tensile and yield strength. However, higher oxygen content in titanium and its alloys also corresponds to lower elasticity and ductility properties. Embodiments of the present disclosure include controlling the oxygen percentage by weight to be between about 0.13 and 0.15%. Industry specifications include a range to allow for different compositions that result in proprietary requirements for any desired, improved, or optimized performance for the intended application.

The additive manufacturing process of the diaphragm tank 100 may also use LPBF to achieve the desired part resolution. This is a layer-based building process by which 2D slices of the manufactured part are fused together in a bed of metal powder. Custom laser parameter sets optimize material properties and structural integrity during the build process. In an embodiment, the material parameters of the additive manufactured materials include a tensile strength of approximately 78 ksi and a yield strength of 59 ksi. The additive manufactured material yields a reduction of area between approximately 45% and 54% during tensile test. These properties contribute to the ductility of the diaphragm tank 100.

Referring now to FIGS. 10-13, Laser Powder Bed Fusion, also known as selective laser melting (SLM), is a layer-wise additive manufacturing method that includes geometrical advantages. This production process can create near-net shape parts with complex internal and external geometry without the need for complex tooling.

Figure 10:
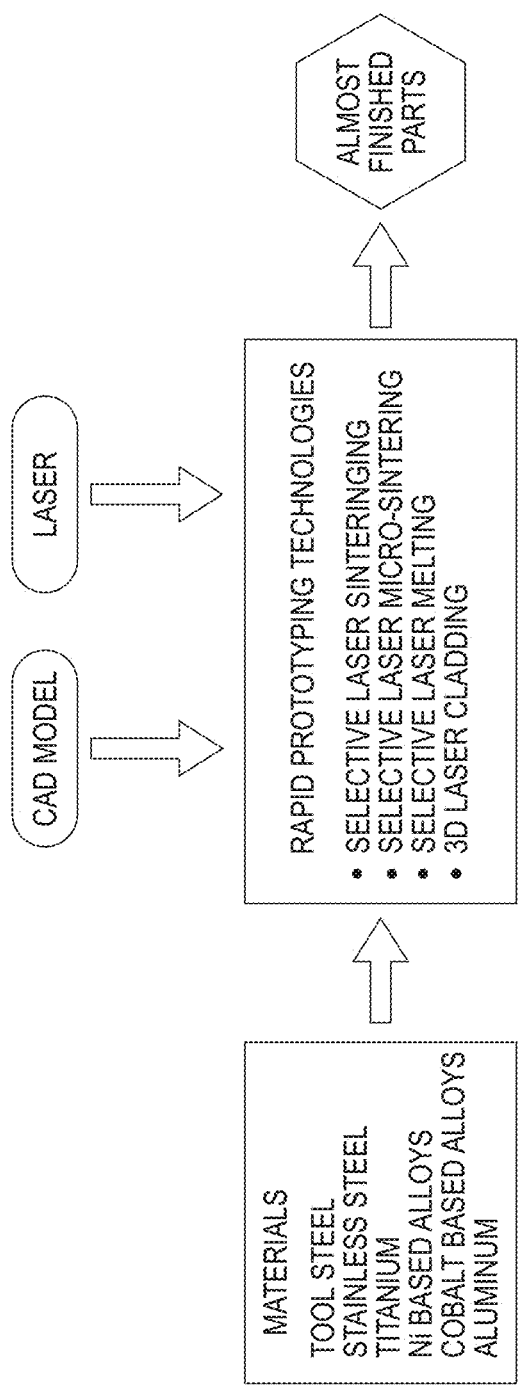
FIG. 10 is a flow diagram of a three-dimensional ("3D") manufacturing process including inputs and outputs to manufacture the diaphragm tank shown in FIG. 1.
Figure 11:
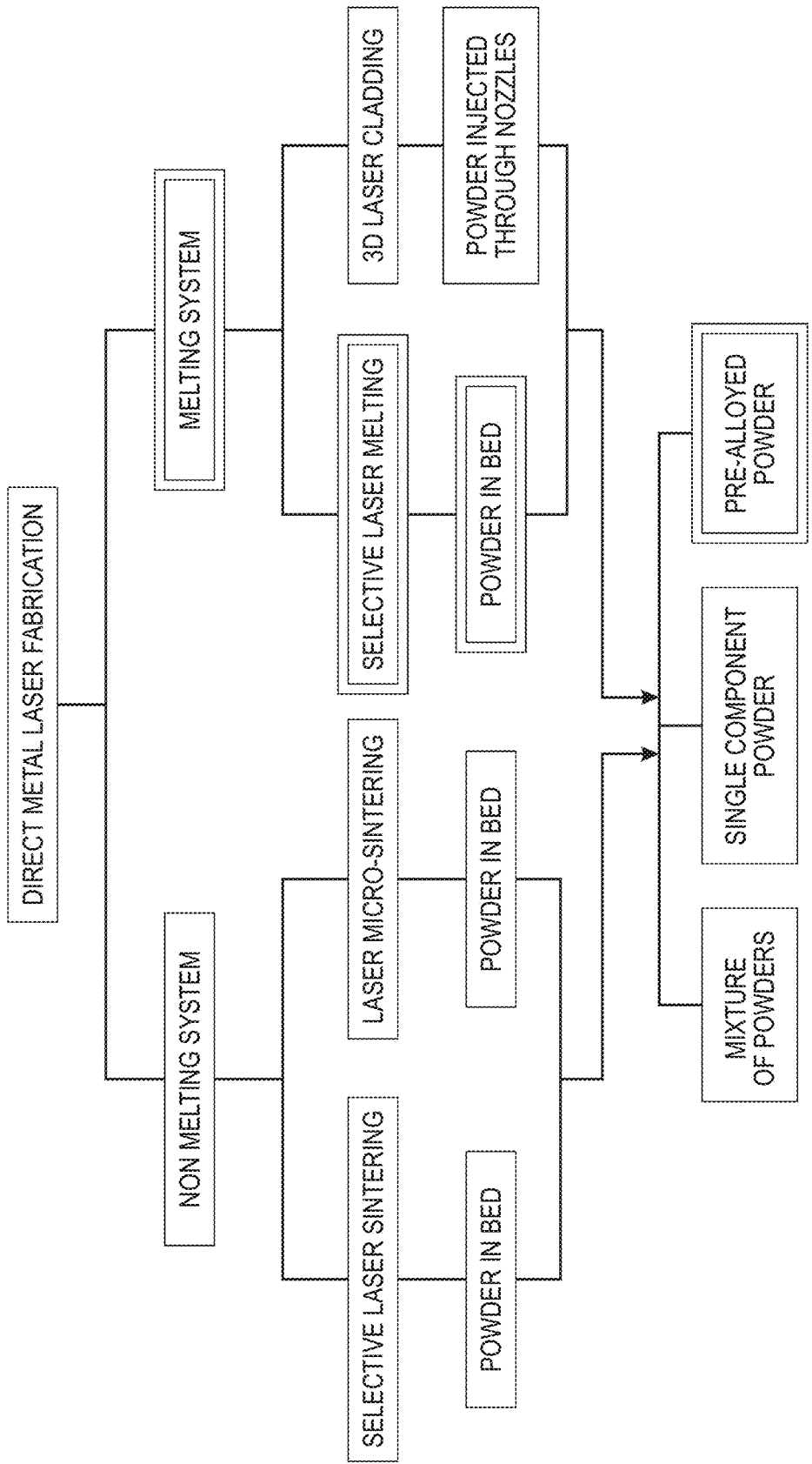
FIG. 11 is a flow diagram of the 3D manufacturing process shown in FIG. 10 including a fabrication family diagram.
Figure 12:
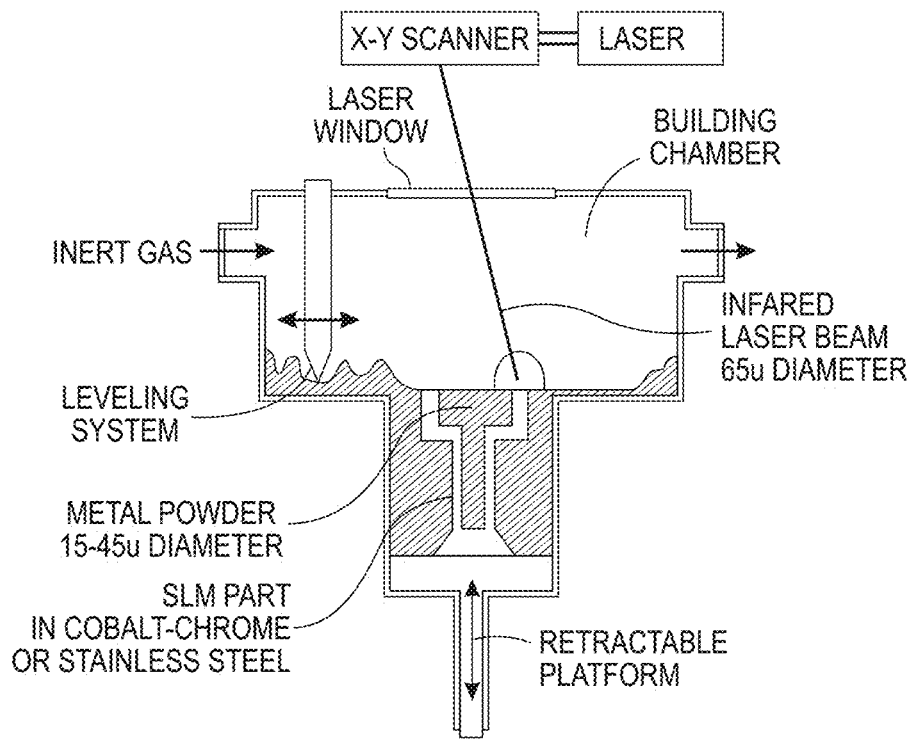
FIG. 12 is a process schematic of the 3D manufacturing process shown in FIG. 10.

As shown in FIGS. 10 and 11, in an embodiment, a method of fabricating the diaphragm tank 100 includes a non-transitory computer readable medium including instructions that when executed on a computer perform a process for printing a three-dimensional diaphragm tank. The computer includes at least a processor and memory and is configured to interact with the additive manufacturing printer for the printing process. The programmed process includes: providing a powder material bed including a powder material for use in printing a first layer of the three-dimensional diaphragm tank; transforming at least a portion of the powder material in the powder material bed using a plurality of energy beams from an energy beam array to form a first hardened layer; rolling additional powder material onto the powder material bed over the first hardened layer to form a second layer of the three-dimensional diaphragm tank; transforming at least a portion of the additional powder material in the powder material bed using the plurality of energy beams from the energy beam array to form a second hardened layer; and repeating the rolling of the additional powder material onto the powder material bed and the transforming of the at least a portion of the additional powder material in the powder material bed to form a three-dimensional monolithic diaphragm tank, the three-dimensional monolithic diaphragm tank including a diaphragm in a center cavity of the three-dimensional monolithic diaphragm tank, the three-dimensional monolithic diaphragm tank being formed by a plurality of hardened layers.

Figure 13:
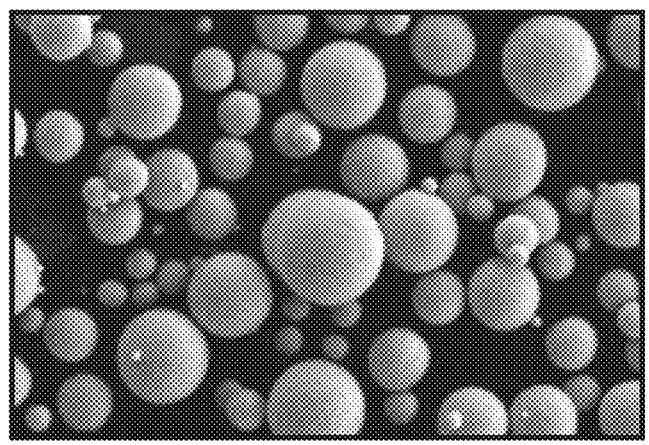
FIG. 13 is detail view of powder material spheres utilized by the 3D manufacturing process shown in FIG. 10.

Powder bed fusion processes include producing a part that is built within a bed of powder. In an embodiment, the powder used in the powder bed fusion process includes approximately 15-45 micron diameter spheres of material, as shown in FIG. 13. The surface of the powder bed fusion is exposed and fused selectively by a laser or electron beam. The build chamber is enclosed in a vacuum or inert atmosphere. After each layer is exposed and selectively fused by the laser or electron beam, the powder bed is lowered by 0.001 inch to 0.002 inch (approximately 0.025 to 0.050 mm). The laser spot size of the powder bed fusion is approximately 65 microns in diameter.

The powder bed fusion process offers the following advantages: near net shaping; no machining is necessary; very complex shapes, that are impossible to form via subtractive manufacturing machines, are possible; internal cavities or passageways of complex shapes and routings are possible; material added only where absolutely needed, hence optimized weight; lower cost, when one-off pieces can be made for different iterations; quick turnaround times for developing variants; and part count reduction through the combination of multiple parts.

The present disclosure additively manufactures a single piece homogenous metallic construction of specific yet variable geometry. The single piece geometry of diaphragm tank 100 may change as long as an external shell of an expulsion side of diaphragm 140 of the diaphragm tank 100 has a positively radiused contour (i.e., inner fillet radius R2). The positively radiused contour R2 allows for complete expulsion of the contained fluid and undesirable fluid entrapment. A radiused geometry allows for a 99% expulsion efficiency as the reversing diaphragm 140 fully reverses and eventually fully contacts a top portion inside wall 160 of the diaphragm tank 100.

Diaphragm tank 100 may also include outer shells, a pressure vessel, or a containment device. The internal features of diaphragm tank 100 may be a diaphragm or a partition. The function of each feature of diaphragm tank 100 may be maintained for diaphragm tank 100 to work properly. The diaphragm tank outer shells contain the fluid (e.g., liquid propellant) to be expelled in the upper chamber 122 at one side of the diaphragm 140, and the working fluid (e.g., expanding gas) in the lower chamber 124 at a second side of the diaphragm 140. The working fluid provides the force to roll and reverse the diaphragm 140. In an embodiment, the volume of the working fluid is increased by activating a downstream opening device that utilizes the propellant. The external tank shell of the diaphragm tank 100 may be designed to withstand a maximum expected operating pressure (MEOP) and the diaphragm 140 of diaphragm tank 100 may be profiled accordingly.

Diaphragm tank 100 may operate differently depending on the ductility or malleability properties of the material powders utilized during the additive manufacturing process. Powder Size Distribution (PSD) and chemical composition of the material powders are important to the material's properties. A change in the PSD or chemical composition will directly affect the strength and ductility of the processed additively manufactured material. The material powders may lower $\Delta P$ across diaphragm 140 and lower the working pressure needed to overcome the strength of the material and to reverse the diaphragm 140.

Diaphragm tank 100 may also be used as a single, dual fluid storage, or containment device that can be held at slightly differential pressures due to the pressure (e.g., work) necessary begin its motion, if this pressure force is determined, then two different fluids can be held at different pressures thereby achieving a net equilibrium (i.e., $P_{side1}=P_{side2}+P_{diaphragm}$). In this way, the diaphragm tank 100 may be used to store different liquids or gases on either side of diaphragm 140. The diaphragm 140 may act as a metallic non-permeable mechanical barrier (e.g., two tanks in one).

Three-dimensional (3D) objects may be constructed of alloys such as metal alloys. The desired alloys may be formed into 3D objects by heating (e.g., melting) the desired alloy or a mixture of its components, and subsequently cooling the desired alloy. In some instances, it may be desired to control the crystal structure and/or metallurgical morphologies of the 3D object or portions thereof. For example, it may be desired to reduce the amount and/or size of dendrites in the alloy at certain portions of the 3D object (e.g., the entire 3D object or the outer portion of the 3D object). The crystal structure and/or metallurgic morphology may alter the physical property of the alloy (e.g., stress, robustness).

The 3D object may be formed by casting, welding, rolling, or any other form of additive manufacturing suitable for the intended purpose and understood by one of ordinary skill in the art. The 3D object may include a cast alloy or a wrought alloy. The 3D object may be formed in a mold. The 3D object may be formed by 3D printing. Three-dimensional (3D) printing (e.g., additive manufacturing) is a process for making a three-dimensional (3D) object of any shape from a design. The design may be in the form of a data source such as an electronic data source, or may be in the form of a hard copy. The hard copy may be a two-dimensional representation of a 3D object. The data source may be an electronic 3D model. 3D printing may be accomplished through an additive process in which successive layers of material are laid down one on top of each other. This process may be controlled (e.g., computer controlled, manually controlled, or both). A 3D printer can be an industrial robot or commercial printer.

3D printing can generate custom parts quickly and efficiently. A variety of materials can be used in a 3D printing process including elemental metal, metal alloy, ceramic, elemental carbon, or polymeric material. In a typical additive 3D printing process, a first material-layer is formed, and thereafter, successive material-layers (or parts thereof) are added one by one, wherein each new material-layer is added on a pre-formed material-layer, until the entire designed three-dimensional structure (3D object) is formed.

3D models may be created utilizing a computer aided design package or via 3D scanner. The manual modeling process of preparing geometric data for 3D computer graphics may be similar to plastic arts, such as sculpting or animating. 3D scanning is a process of analyzing and collecting digital data on the shape and appearance of a real object. Based on this data, 3D models of the scanned object can be produced. The 3D models may include computer-aided design (CAD).

Additive manufacturing processes may differ in the manner in which layers are deposited to create the materialized structure. They may vary in the material or materials that are used to generate the designed structure. Some methods melt or soften material to produce the layers. Examples for 3D printing methods include selective laser melting (SLM), selective laser sintering (SLS), direct metal laser sintering (DMLS), shape deposition manufacturing (SDM) or fused deposition modeling (FDM). Other methods cure liquid materials using different technologies such as stereo lithography (SLA). In the method of laminated object manufacturing (LOM), thin layers (e.g., made inter alia of paper, polymer, metal) may be cut to shape and joined together.

Some complex 3D objects may include enlarged cavities having at least one substantially planar or nearly planar face. Some complex 3D objects may require a specific (e.g., preferred) print orientation according to which the printing should progress (e.g., due to material strength constraints). For example, the desired 3D object may include a desired axis along which the printing should ideally progress. A model of the desired 3D object may be aligned according to this specific orientation. Subsequent thereto, the model of the 3D object may exhibit a substantially planar (e.g., flat) or nearly planar surfaces in both the top and bottom of the 3D object. The printing process of such structures may be challenging and require support structures (e.g., within the chamber) which are difficult and/or impossible to remove. The present disclosure provides methods, systems, apparatuses and/or software that effectuate the generation of such 3D objects.

Figure 15:
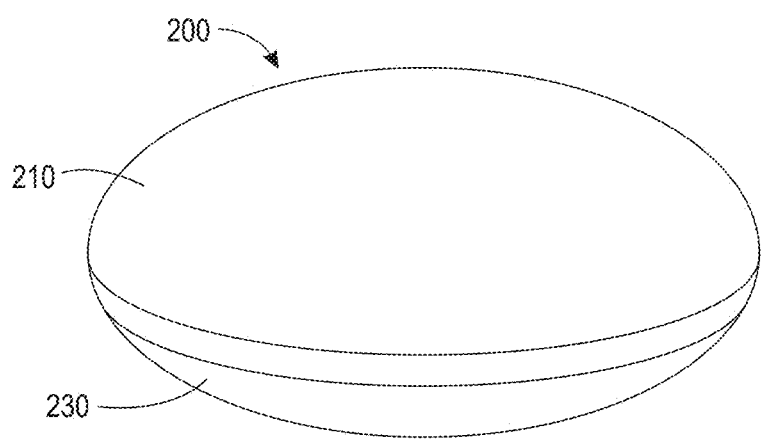
FIG. 15 is a top perspective view of a diaphragm tank according to an embodiment of the present disclosure.
Figure 16:
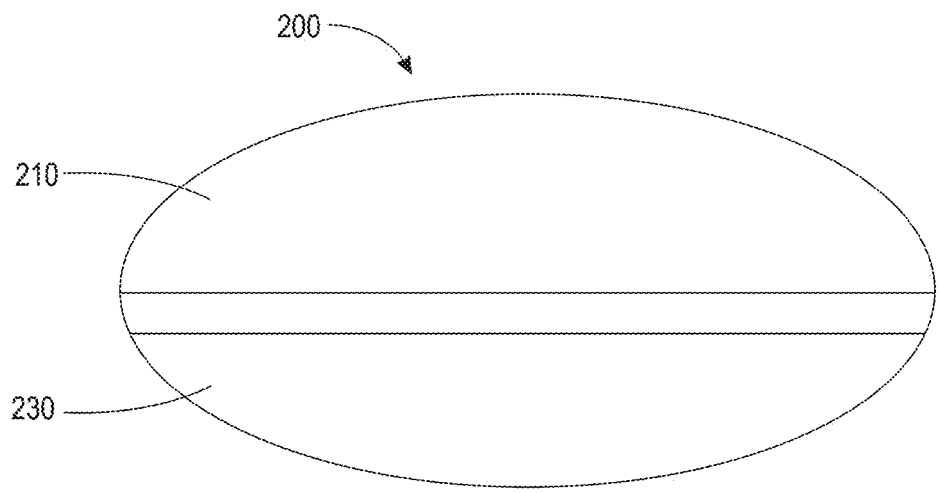
FIG. 16 is a side view of the diaphragm tank shown in FIG. 15.
Figure 17:
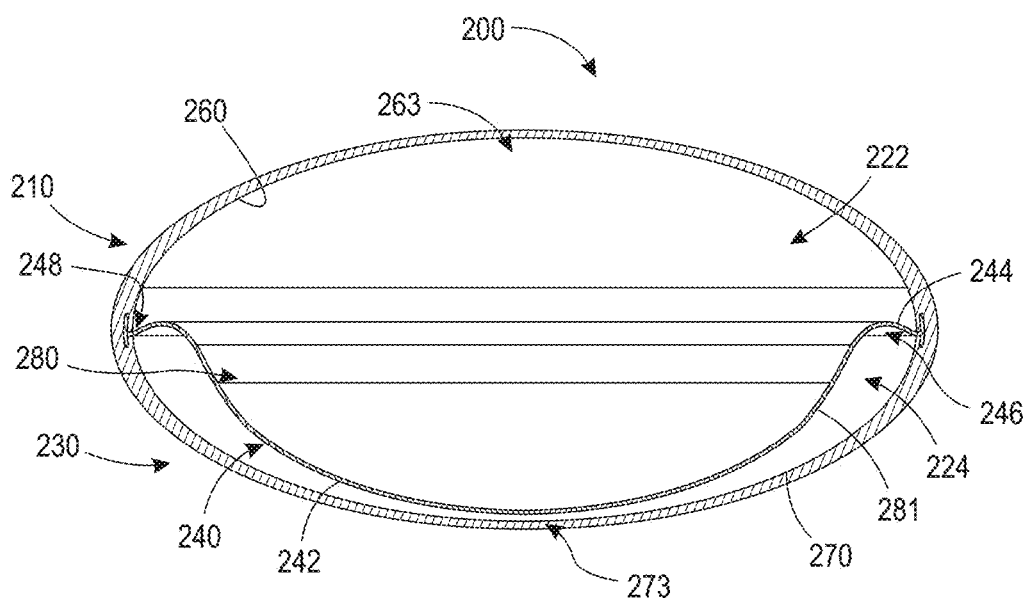
FIG. 17 is a cross-sectional side view of the diaphragm tank shown in FIG. 15.

Referring now to FIGS. 15-17, an embodiment of a rolling diaphragm tank 200 is provided. The diaphragm tank 200 is a fluid (liquid or gas) containment and positive expulsion mechanism generally comprising a top shell portion 210 and a bottom shell portion 230 defining an interior volume of the diaphragm tank 200. The diaphragm tank 200 also includes an internal diaphragm 240 separating the interior volume of the diaphragm tank 200 into an upper chamber 222 and a lower chamber 224. As described above, the diaphragm tank 200 is formed as a single unitary piece and is thereby monolithic, is additively manufactured, and has a homogeneous and isotropic material composition.

The diaphragm tank top portion and bottom portion 210, 230 each have a generally domed configuration and do not include an intermediate portion therebetween. As illustrated in FIG. 17, the diaphragm 240 includes a diaphragm body 242, a diaphragm collar 244, a diaphragm gutter 246, a diaphragm junction 248, a diaphragm upper surface 280, and a diaphragm lower surface 281 similar to the corresponding parts in the above-referenced diaphragm tank 100. The diaphragm tank top shell portion 210 includes an upper portion inner surface 260 and an upper peak 263. The diaphragm tank bottom shell portion 230 includes a bottom portion inner surface 270 and a bottom peak 273.

In this embodiment, a fluid (e.g., liquid or gas) is injected through an opening (e.g., inlet/outlet port) in the top shell portion 210 into the upper chamber 222 thereby forcing the diaphragm 240 downwards towards the bottom shell portion 230. Another fluid is injected through an opening (e.g., inlet port) in the bottom shell portion 230 into the lower chamber 224, pressurizing the lower chamber 224 and providing an opposite force onto the diaphragm 240 until a stable position is obtained by the diaphragm 240. Thereafter, when the top shell portion opening is released, the fluid in the upper chamber 222 is forced through the top shell portion opening because of the upward pressure exerted by the diaphragm 240 mechanical properties at the diaphragm junction 248 and by the pressure caused by the fluid in lower chamber 224. In an embodiment, the top shell portion 210 includes one or more outlet ports by which the fluid (e.g., propellant) in the upper chamber 222 is expelled from the diaphragm tank 200.

Figure 18:
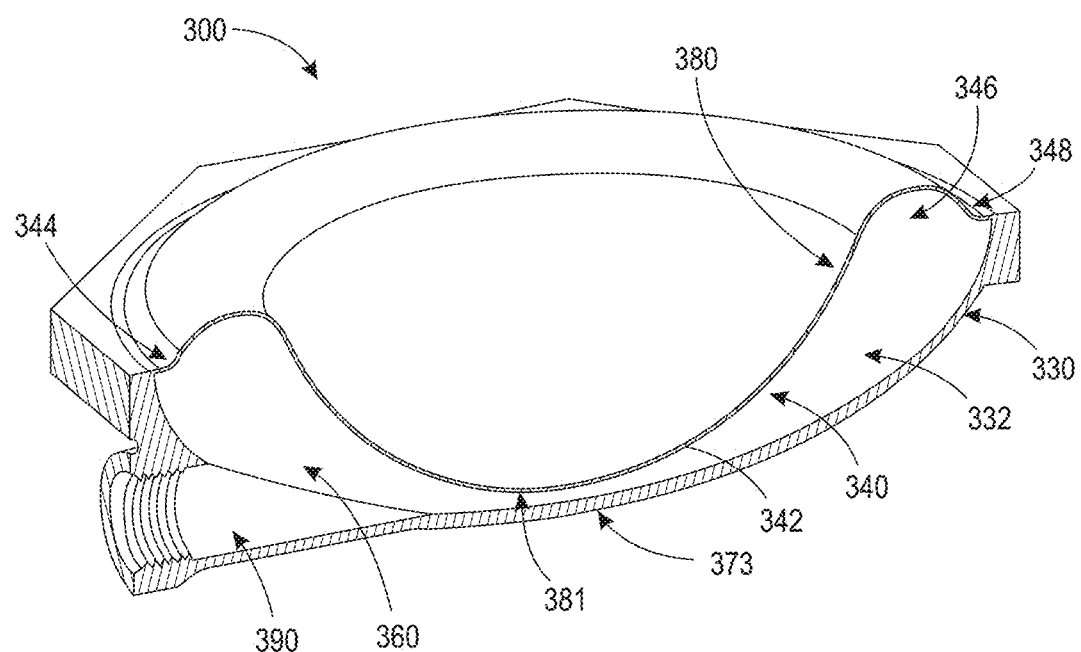
FIG. 18 is a cross-sectional perspective view of a diaphragm tank according to an embodiment of the present disclosure.

As illustrated in FIG. 18, in an embodiment, a diaphragm tank 300 is a one-time use expulsion device and, by design, has a diaphragm 340 that may permanently deform as propellant (or any fluid) is expelled. The diaphragm tank 300 generally comprises a diaphragm 340 and a bottom shell portion 330 defining a chamber 322. Diaphragm tank 300 is formed as a single unitary piece and is thereby monolithic, is additively manufactured, and has a homogeneous and isotropic material composition.

The diaphragm 340 includes a diaphragm body 342, a diaphragm collar 344, a diaphragm gutter 346, a diaphragm junction 348, a diaphragm upper surface 380, and a diaphragm lower surface 381 similar to the corresponding parts in the above-referenced diaphragm tank 100. The diaphragm tank bottom shell portion 330 includes an inner surface 360, a bottom peak 373, and a bottom opening 390 (e.g., inlet/outlet port). In this embodiment, a fluid (e.g., propellant) is injected through the opening 390 into chamber 322. This action pressurizes chamber 322 and forces the diaphragm 340 in an upward direction. While the fluid is in chamber 322, the diaphragm 340 is constantly applying a downward pressure because of the mechanical structure and angle of the diaphragm junction 348. Thereafter, the opening 390 is operable to be placed in an open state, thereby allowing the fluid to be forced out by the pressure exerted upon the fluid by the diaphragm 340.

The present embodiments of the diaphragm tank are manufactured in a manner that ensures uniformity and provides an expulsion performance that is more predictable and symmetric with isotropic ductility established during the additive manufacturing process of the diaphragm tank.

It should be appreciated that certain features of the diaphragm tank 100, 200, 300, which are, for clarity, described in the context of separate embodiments, may also be provided in combination in a single embodiment. Conversely, various features of the diaphragm tank 100, 200, 300, which are, for brevity, described in the context of a single embodiment, may also be provided separately or in any suitable combination. While various embodiments have been described in detail above, it should be understood that they have been presented by way of example, and not limitation. It will be apparent to persons skilled in the relevant arts that the disclosed subject matter may be embodied in other specific forms, variations, and modifications without departing from the scope, spirit, or essential characteristics thereof. The embodiments described above are therefore to be considered in all respects as illustrative, and not restrictive. The scope of the invention is indicated by the appended claims, and all changes that come within the meaning and range of equivalents thereof are intended to be embraced therein.

What is claimed is:
1. A three-dimensional monolithic diaphragm tank, the diaphragm tank comprising:
   a first portion having a first inner surface;
   a second portion having a second inner surface;
   a deformable diaphragm extending from a peripheral junction with said first inner surface and said second inner surface;
   said first inner surface and said diaphragm defining a first chamber;

said second inner surface and said diaphragm defining a second chamber;

said first portion having an outlet port in fluid communication with said first chamber;

said second portion having an inlet port in fluid communication with said second chamber; and said peripheral junction of said diaphragm and said first inner surface including an integral inner fillet having an inner radius.

2. The three-dimensional monolithic diaphragm tank of claim 1, wherein said diaphragm includes a variable thickness across said diaphragm.

3. The three-dimensional monolithic diaphragm tank of claim 2, wherein said variable thickness of said diaphragm tapers from said peripheral junction to a central point of said diaphragm, said diaphragm having a portion adjacent to said peripheral junction having a larger thickness than said central point of said diaphragm.

4. The three-dimensional monolithic diaphragm tank of claim 1, wherein said diaphragm includes a diaphragm gutter having a gutter radius.

5. The three-dimensional monolithic diaphragm tank of claim 4, wherein said diaphragm extends upwardly from said peripheral junction as defined by said inner radius and downwardly as defined by said gutter radius.

6. The three-dimensional monolithic diaphragm tank of claim 1, wherein said first inner surface includes a plurality of inwardly protruding ridges.

7. The three-dimensional monolithic diaphragm tank of claim 6, wherein said plurality of inwardly protruding ridges includes a first series of inwardly protruding ridges located perpendicular to a second series of inwardly protruding ridges.

8. The three-dimensional monolithic diaphragm tank of claim 1, wherein said inner fillet comprises a curved surface connecting a surface of said diaphragm and said first inner surface, wherein said inner fillet is operable to prevent development of a stress point at said peripheral junction.

9. A three-dimensional monolithic diaphragm tank, the diaphragm tank comprising:
a first portion having a first inner surface;
a second portion having a second inner surface, said second portion coupled with said first portion, wherein said first and second portions are orientated about a central axis;
a deformable diaphragm extending from a peripheral junction with said first inner surface and said second inner surface;
said first inner surface and said diaphragm defining a first chamber;
said second inner surface and said diaphragm defining a second chamber;
said first portion having a first outlet port in fluid connection with said first chamber;
said first portion having a second outlet port in fluid connection with said first chamber, wherein said first and second outlet ports are offset from said central axis and each other such that fluid communication from said first outlet port is independent of fluid communication from said second outlet port; and
said second portion having an inlet port in fluid connection with said second chamber.

10. The three-dimensional monolithic diaphragm tank of claim 9, wherein said diaphragm includes a variable thickness across said diaphragm.

11. The three-dimensional monolithic diaphragm tank of claim 10, wherein said variable thickness of said diaphragm tapers from said peripheral junction to a central point of said diaphragm, said diaphragm having a portion adjacent to said peripheral junction having a larger thickness than said central point of said diaphragm.

12. The three-dimensional monolithic diaphragm tank of claim 9, wherein said diaphragm includes a diaphragm gutter having a gutter radius.

13. The three-dimensional monolithic diaphragm tank of claim 12, wherein said peripheral junction of said diaphragm and said first inner surface comprises: an integral fillet having an inner radius, wherein said diaphragm extends upwardly from said peripheral junction as defined by said inner radius and downwardly as defined by said gutter radius.

14. The three-dimensional monolithic diaphragm tank of claim 9, wherein said first inner surface includes a plurality of inwardly protruding ridges operable to facilitate expulsion of a material from said first chamber through said first and second outlet ports.

15. The three-dimensional monolithic diaphragm tank of claim 14, wherein said plurality of ridges include a first series of ridges located perpendicular to a second series of ridges.

16. A three-dimensional monolithic diaphragm tank, the diaphragm tank comprising:
a first portion having a first inner surface;
a second portion having a second inner surface, said second portion coupled with said first portion, wherein said first and second portions are orientated about a central axis;
a deformable diaphragm extending from a peripheral junction with said first inner surface and said second inner surface;
said first inner surface and said diaphragm defining a first chamber;
said second inner surface and said diaphragm defining a second chamber;
said first portion having an outlet port in fluid connection with said first chamber;
said second portion having an inlet port in fluid connection with said second chamber; and said first portion, said second portion, and said diaphragm being formed as a unitary piece, having a monolithic and isotropic structure, and being of a uniform composition of metal material.

17. The three-dimensional monolithic diaphragm tank of claim 16, wherein said diaphragm includes a variable thickness across said diaphragm.

18. The three-dimensional monolithic diaphragm tank of claim 17, wherein said variable thickness of said diaphragm tapers from said peripheral junction to a central point of said diaphragm, said diaphragm having a portion adjacent to said peripheral junction having a larger thickness than said central point of said diaphragm.

19. The three-dimensional monolithic diaphragm tank of claim 16, wherein said diaphragm includes a diaphragm gutter having a gutter radius.

20. The three-dimensional monolithic diaphragm tank of claim 19, wherein said peripheral junction of said diaphragm and said first inner surface comprises: an integral fillet having an inner radius, wherein said diaphragm extends upwardly from said peripheral junction as defined by said inner radius and downwardly as defined by said gutter radius.

21. The three-dimensional monolithic diaphragm tank of claim 16, wherein said first inner surface includes a plurality of inwardly protruding ridges.

22. The three-dimensional monolithic diaphragm tank of claim 21, wherein said plurality of ridges includes at least a first series of ridges located perpendicular to a second series of ridges.

23. The three-dimensional monolithic diaphragm tank of claim 21, wherein said inner radius of said fillet is 0.005 inches or greater.

* * * * *